(12) United States Patent
Eschenbach et al.

(10) Patent No.: US 11,204,195 B2
(45) Date of Patent: Dec. 21, 2021

(54) METHOD FOR PREPARING A TRANSPORT CONTAINER

(71) Applicant: VA-Q-TEC AG, Würzburg (DE)

(72) Inventors: Fabian Eschenbach, Rottendorf (DE);
Joachim Kuhn, Würzburg (DE);
Thomas Taraschewski, Würzburg (DE)

(73) Assignee: VA-Q-TEC AG, Würzburg (DE)

( * ) Notice: Subject to any disclaimer, the term of this patent is extended or adjusted under 35 U.S.C. 154(b) by 250 days.

(21) Appl. No.: 16/480,733

(22) PCT Filed: Jan. 2, 2018

(86) PCT No.: PCT/EP2018/050054
§ 371 (c)(1),
(2) Date: Jul. 25, 2019

(87) PCT Pub. No.: WO2018/137897
PCT Pub. Date: Aug. 2, 2018

(65) Prior Publication Data
US 2019/0383544 A1    Dec. 19, 2019

(30) Foreign Application Priority Data
Jan. 25, 2017    (DE) ..................... 10 2017 000 622.9

(51) Int. Cl.
*F25D 3/06*  (2006.01)
*F28D 20/02*  (2006.01)
*F16L 59/065*  (2006.01)

(52) U.S. Cl.
CPC ............... *F25D 3/06* (2013.01); *F28D 20/02* (2013.01); *F16L 59/065* (2013.01);
(Continued)

(58) Field of Classification Search
CPC .... F25D 3/06; F25D 2201/14; F25D 2303/08; F25D 2331/8014; F28F 20/02; F16L 59/065; Y02E 60/14
See application file for complete search history.

(56) References Cited

U.S. PATENT DOCUMENTS 5,103,651 A     4/1992  Coelho et al.
2004/0231355 A1* 11/2004  Mayer ....................... F25D 3/06
                                                   62/371
(Continued)

FOREIGN PATENT DOCUMENTS

CN      102022876 A      4/2011
DE      10058566 C2     10/2002
(Continued)

OTHER PUBLICATIONS

International Preliminary Report on Patentability for International Application No. PCT/EP2018/050054, dated Aug. 8, 2019.

(Continued)

*Primary Examiner* — Emmanuel E Duke
(74) *Attorney, Agent, or Firm* — Jason H. Vick; Sheridan Ross, PC

(57) ABSTRACT

The invention relates to a method for preparing a transport container which has an accommodation space for goods to be transported, said accommodation space being insulated by external thermal insulation. At an equipment site, the accommodation space is equipped with preconditioned, main latent heat storage elements necessary for a target heat capacity. In addition to the preconditioned, main latent heat storage elements, the accommodation space is also equipped with further thermal energy storage elements, the auxiliary energy storage elements, which are preconditioned to a specified temperature. This means that a longer transfer time period can be allowed after equipping and before filling the accommodation space with the goods to be transported, such (Continued)

that, from the filling time, the full target time period within the desired target temperature range is available for transporting the goods to be transported.

15 Claims, 1 Drawing Sheet

(52) U.S. Cl.
CPC ...... *F25D 2201/14* (2013.01); *F25D 2303/08* (2013.01); *F25D 2331/8014* (2013.01)

(56) References Cited

U.S. PATENT DOCUMENTS

| | | | |
|---|---|---|---|
| 2007/0051734 A1 | 3/2007 | Kuhn | |
| 2007/0186577 A1 | 8/2007 | Goncharko | |
| 2008/0276643 A1* | 11/2008 | Heroux | A01N 1/0273 62/457.2 |
| 2009/0039088 A1* | 2/2009 | Williams | F25D 3/08 220/592.26 |
| 2010/0314397 A1* | 12/2010 | Williams | B65D 81/3823 220/592.01 |
| 2012/0197810 A1* | 8/2012 | Haarmann | F25D 3/08 705/302 |
| 2012/0305435 A1* | 12/2012 | Matta | B65D 81/3862 206/521 |
| 2014/0151382 A1* | 6/2014 | White | B65D 81/3862 220/592.2 |
| 2015/0292787 A1* | 10/2015 | Kuhn | F25D 29/003 62/60 |
| 2017/0073147 A1* | 3/2017 | Kuhn | B65D 81/3825 |

FOREIGN PATENT DOCUMENTS

| | | |
|---|---|---|
| DE | 10159518 | 6/2003 |
| DE | 102012006743 A1 | 10/2013 |
| DE | 102013200746 A1 | 7/2014 |
| EP | 2604956 A1 | 6/2013 |
| EP | 2759789 A1 | 7/2014 |
| EP | 2873937 A1 | 5/2015 |
| EP | 2883812 A1 | 6/2015 |
| WO | WO 2004/104498 | 12/2004 |
| WO | WO 2014/094995 | 6/2014 |
| WO | WO-2014111526 A1 * | 7/2014 ............... F25D 3/06 |

OTHER PUBLICATIONS

Themeninfo IV/02 "Latent Heat Storages" (Includes English translation of Abstract) published in 2002, ISSN 1610-8302, available at http://www.bine.info/publikationen/themeninfos/publikation/latentwaermespeicher/.
International Search Report for International Application No. PCT/EP2018/050054, dated Apr. 6, 2018.
Written Opinion for International Application No. PCT/EP2018/050054, dated Apr. 6, 2018.

* cited by examiner

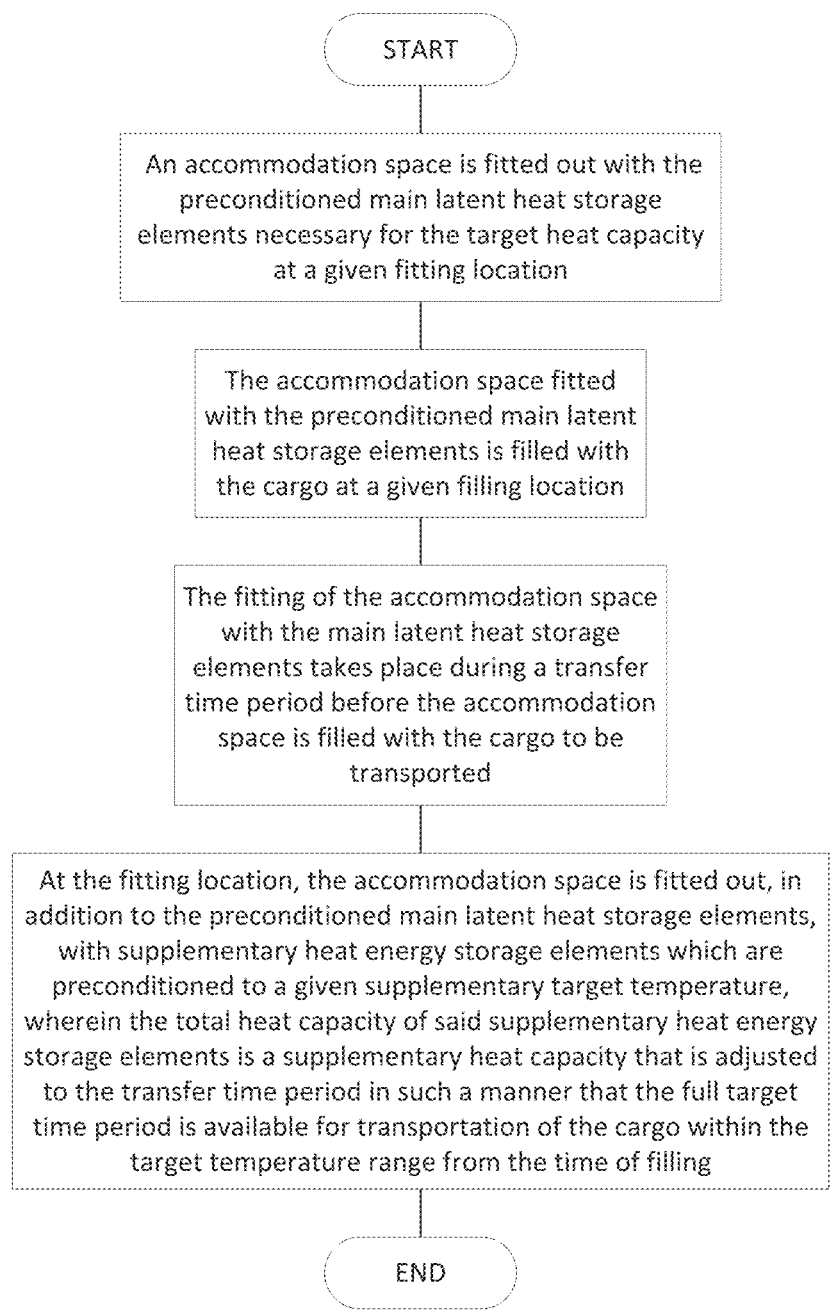

METHOD FOR PREPARING A TRANSPORT CONTAINER

CROSS REFERENCE TO RELATED APPLICATIONS

This application is a national stage application under 35 U.S.C. 371 of PCT Application No. PCT/EP2018/050054 having an international filing date of 2 Jan. 2018, which designated the United States, which PCT application claimed the benefit of German Application No. 10 2017 000 622.9, filed 25 Jan. 2017, each of which are incorporated herein by reference in their entirety.

The invention relates to a method for preparing a transport container by means of which temperature-sensitive cargo can be transported at a temperature falling within a predetermined target temperature range. The subject matter of the invention is a method having the features of the preamble of claim 1.

BRIEF DESCRIPTION OF THE FIGURE

The FIGURE illustrates an exemplary method for preparing a transport container.

Transport containers of the kind in question are used for special transport purposes in which the cargo must necessarily be kept within a given temperature range—the target temperature range—during transportation. For this purpose, a transport container of this kind has an accommodation space which is very well insulated on all sides. Requirements of this kind made of transport containers apply, for example, to the transport of temperature-sensitive cargo such as pharmaceuticals, biotechnological products, transplantation products or blood products. In this field of application, the optimum transport and storage temperature that must necessarily be observed is, for example, 2° C. to 8° C. The products are often only actually stable within a narrow temperature range. These products must therefore be transported and stored within this temperature range. Frequently, products of this kind which are very sensitive to the transport temperature must also not be allowed to freeze under any circumstances. Temperatures below 0° C. have to be reliably avoided in this case. The important thing, therefore, is to reliably achieve and maintain the target temperature with a comparatively small deviation. The range within which the target temperature falls is referred to in the present case as the target temperature range.

In order to keep the accommodation space of the transport container within the target temperature range over the desired time period—the target time period—latent heat storage elements are located in the accommodation space during the transportation of the cargo, said latent heat storage elements having been preconditioned to a specific temperature—the target temperature. This temperature is maintained by latent heat storage elements during the phase transition with little deviation. The value of the target temperature in each case is obtained from the latent heat storage material used for the latent heat storage element. Specific reference is made in this respect to the prior art as described in WO 2014/094995 A2.

When the plural "latent heat storage elements" is used in the present case, the reason for this is that in the vast majority of applications in the accommodation space of a transport container, multiple main latent heat storage elements, usually at least two main latent heat storage elements, are used. Under patent law terms, however, the plural "latent heat storage elements" should also include the singular "latent heat storage element". The invention is of course also relevant if, by way of exception, there should only be precisely one main latent heat storage element in the accommodation space of the transport container.

The thermal insulation for the accommodation space can be achieved in any conventional way. The use of vacuum insulation panels as a component of thermal insulation is particularly expedient. Reference is also made in this respect to the prior art of WO 2014/094995 A2 described above, but also to WO 2004/104498 A2. Reference is also made to DE 100 58 566 C2 for vacuum insulation panels in particular, which relates back to the applicant of the present application.

In the case of the method known from the prior art, the transport container is prepared by fitting out the accommodation space with the already preconditioned main latent heat storage elements which are necessary for the target heat capacity. This guarantees that the temperature in the accommodation space quickly reaches the target temperature range. This fitting is carried out at a given location—the fitting location.

After it has been fitted out, the transport container is ready to receive cargo in the accommodation space. The filling of the accommodation space of the transport container with cargo likewise takes place at a specific location—the filling location. The filling location may be the same location as the fitting location, but the filling location is frequently remote from the fitting location. This is particularly the case when preparation of the transport container takes place at the fitting location on the premises of the transport container supplier, while filling of the accommodation space of the transport container with the relevant cargo takes place at the premises of the supplier's customer, so at a pharmaceutical company, for example, which fills the accommodation space of the transport container with the sensitive pharmaceuticals on its own premises.

In any event, it is true that the accommodation space is fitted with the main latent heat storage elements a considerable period of time before said accommodation space is filled with the cargo.

The difficulty arising from the sequence of events described above is that even when choosing the type and number of the main latent heat storage elements, a further time period has to be taken into account in addition to the target time period actually envisaged, this further time period being lost on the actual transportation of the cargo being transported in the transport container and namely being the time period between the fitting-out of the accommodation space and the filling of said accommodation space, referred to here as the transfer time period.

If, for example, a transport container with a target time period of 96 hours is used, a transport container of this kind naturally already has a safety buffer from the manufacturer, so that it is guaranteed that the target time period will be observed, even under unfavorable marginal conditions. In this example, the safely observed target time period would be 96 hours, in other words four full days, with an additional safety margin of 4 hours, for example.

If the transfer time period can be expected to be longer, it can no longer be guaranteed that the cargo will actually be transported right to the end within the target temperature range during transportation by means of the transport container. Consequently, in the prior art the manufacturer or supplier stipulates the precise time by which a transport container has to be filled after the accommodation space has been fitted out. This precise stipulation is sometimes felt to be restrictive, meaning that the teaching of the present invention is based on the problem of improving the method known in the art for preparing a transport container in order to provide greater flexibility in relation to the transfer time period.

The problem previously disclosed is solved in a method for preparing a transport container having the features of the preamble of claim 1 by the features of the characterizing part of claim 1.

According to the invention, in addition to the main latent heat storage elements intended for the correct transportation of the cargo in the accommodation space and precalculated in relation to the required heat capacity, supplementary energy storage elements are introduced into the accommodation space at the fitting location. Depending on the expected transfer time period, the heat capacity added by the supplementary energy storage elements is set in such a manner that, starting from the time at which the accommodation space is filled with the cargo, the full target time period with the target temperature range is in any event available.

Under patent law terms, the plural form used in the case of the supplementary energy storage elements also covers the singular form; a single supplementary energy storage element is sufficient to realize the teaching of the invention. It is important for an additional supplementary heat capacity which is not adjusted to the target time period, but to the transfer time period, to be introduced into the accommodation space of the transport container, by means of which the transfer time period can be covered.

For the supplementary energy storage elements, it may be advisable for these to be kept at a lower temperature than the target temperature of the main latent heat storage elements, insofar as it must be prevented at all costs that the target temperature range is left for higher temperatures. However, it must also be taken into account in this case that the supplementary target temperature of the supplementary energy storage elements must not be too low either, in order to prevent undercooling of the cargo to be filled in later.

All kinds of energy storage elements are possible for the supplementary energy storage elements. The only important thing is that the material of these supplementary energy storage elements has an adequate specific or latent heat energy. They need not necessarily be latent heat storage elements. For example, they may be a container of very cold—but still liquid—water, an inexpensive, unfrozen gel freezer pack, or another material with a high heat capacity. It is also possible to use active energy storage elements to which energy is actively supplied. According to the preferred teaching of the invention, however, it is provided that latent heat storage elements are likewise used as supplementary energy storage elements.

All systems of the prior art are typically considered possible as latent heat storage elements, in other words both as main latent heat storage elements and as supplementary latent heat storage elements.

At a target temperature (temperature of the phase transition) of approximately 0° C., water with different additives can be used as the latent heat storage material. Salt solutions which have been suitably prepared are used for refrigerated storage below 0° C.

Other materials, for example those based on paraffins, are better suited in the range just above 0° C., As background, specific reference is made to the review article of the BINE Information Service "Themeninfo IV/02 aus dem Jahre 2002", (Karlsruhe Technical Information Centre, Project Reference 0329840A-D, available at www.bine.info, keyword: "Latent heat storage"). The content of this reference on the general background of latent heat storage materials and its application possibilities are hereby incorporated by reference.

A latent heat storage element according to the present invention is a latent heat storage material in a sealed casing, possibly also provided with a pressure compensation valve. This is also referred to as a macro-encapsulated PCM material. The casing is frequently made of plastic. The basic construction is known from so-called thermal packs, for example.

Latent heat storage elements of the kind in question are now available in a plurality of target temperatures, in particular also from the Applicant ("va-Q-tec Packaging Portfolio, January 2011" brochure). Latent heat storage elements for target temperatures of 37° C., 22° C., 4° C., 0° C., −19° C., −21° C. and −32° C. can be found there. Other suppliers have similar latent heat storage elements in their product range, in some cases also for other target temperatures.

Overall, reference is also again made to this extent to the aforementioned sources on the prior art. Interesting details are also disclosed in DE 10 2012 006 743 A1, for example, namely also with regard to the thermal insulation to be used.

In terms of the sequence of the method, it is expedient for the supplementary energy storage elements to be removed from the accommodation space at the filling location before or during the filling process. In this way, the heat capacity of the supplementary energy storage elements is removed from the accommodation space at the filling location, in other words before filling. Precisely defined marginal conditions for the actual transportation of the cargo under the influence of the main latent heat storage elements are therefore guaranteed.

According to a preferred embodiment of the method according to the invention, at least one of the supplementary energy storage elements removed from the accommodation space before or during filling is reused, for example for fitting-out another transport container. Accordingly, in the method according to the invention, supplementary energy storage elements which have already been used (once or multiple times) can be introduced into the accommodation space. Alternatively, the supplementary energy storage elements removed from the accommodation space are disposed of.

If there is sufficient space available in the accommodation space and the target temperature range is maintained, one of the supplementary energy storage elements, or several or all supplementary energy storage elements, can be left in the accommodation space during and after filling.

The method according to the invention requires a certain additional expenditure which is not required in all cases. If it can be assumed with a degree of probability bordering on certainty that the safety margin built into the design of the transport container includes the transfer time period, the additional expenditure is not required. Consequently, according to the preferred teaching it is recommended that the method is (only) used if the expected transfer time period exceeds a given proportion of the target time period, in particular, is more than approximately 4%, quite particularly more than approximately 10%, of the target time period.

In the case of the variant explained above, with a target time period of 96 hours (including a safety margin designed for 100 hours) it is recommended, for example, that the method should only be used if the transfer time period is more than 4 hours, in particular at least 9.5 hours. In the case of a transport container which is designed for a very short running time of only 24 hours, for example, the method according to the invention will probably be applied even with a transfer time period of at least 1 hour or at least 2 hours.

In the method according to the invention, the supplementary energy storage elements can be arranged in such a manner that they are in contact to one or multiple main latent heat storage element(s). The supplementary energy storage elements are located on one or multiple main latent heat storage element(s), for example.

According to a preferred embodiment of the method according to the invention, at least one of the supplementary energy storage elements is provided with a spacer, so that this supplementary energy storage element is not in contact with the main latent heat storage elements or maintains a minimum distance from the main latent heat storage elements. This procedure ensures a more uniform distribution of the thermal energy of the supplementary energy storage element.

It has already been pointed out previously with reference to the prior art that the thermal insulation for the accommodation space is of particular importance. According to the preferred teaching, it should have vacuum insulation panels or consist of vacuum insulation panels.

However, many other insulation materials can also be used alone or in addition, for example particle foams as expanded polypropylene (EPP), expanded polystyrene (EPS), made of polyurethane (PU) or also anything in conjunction with vacuum insulation panels.

According to a further preferred teaching, an embodiment of the method according to the invention is recommended so that the main latent heat storage elements and the vacuum insulation panels, if present, are tested for functional capability and compliance with target values at the fitting location.

Thermal insulation exists which is outwardly so mechanically tight that it can at the same time be used overall as an outer casing. Otherwise, it is expedient for an outer casing surrounding the thermal insulation on the outside to be provided in addition, which outer casing can likewise be opened in order to be able to fill and empty the accommodation space.

The invention claimed is:

1. A method to prepare a transport container,
   wherein the transport container has an accommodation space for cargo to be transported and thermal insulation surrounding the accommodation space on all sides and wherein the thermal insulation can be opened in order to fill and empty the accommodation space,
   wherein a temperature in the accommodation space is maintained over a target period of time during the transportation of the cargo within a target temperature range by main latent heat storage elements arranged in the accommodation space and preconditioned to a target temperature and having a target heat capacity,
   having the following method steps:
      supplying the preconditioned main latent heat storage elements necessary for the target heat capacity at a fitting location, wherein the supplying of the preconditioned main latent heat storage elements takes place within a transfer time period before the accommodation space is filled with the cargo to be transported,
      at the fitting location, supplying supplementary heat energy storage elements which are preconditioned to a supplementary target temperature, wherein a supplementary heat capacity of the supplementary heat energy storage elements is matched to the transfer time period to ensure that the full target period of time is available for transportation of the cargo within the target temperature range, and
      filling the accommodation space, at a filling location, with the cargo to be transported, wherein the filling location is remote from the fitting location.

2. The method of claim 1, wherein
   the supplementary heat energy storage elements are removed from the accommodation space at the filling location before or during filling with the cargo.

3. The method of claim 2, wherein
   the supplementary heat energy storage elements that have been removed are temporarily stored for reuse as supplementary heat energy storage elements.

4. The method of claim 1, wherein
   previously used supplementary heat energy storage elements are used again as supplementary heat energy storage elements.

5. The method of claim 1, wherein
   the method is used when an expected transfer time period exceeds a given proportion of the target time period.

6. The method of claim 5, wherein the expected transfer time period exceeds a given proportion of the target time period by more than approximately 4%.

7. The method of claim 5, wherein the method is used when the expected transfer time period exceeds a given proportion of the target time period by more than approximately 10%.

8. The method of claim 1, wherein
   the thermal insulation comprises vacuum insulation panels or consists of vacuum insulation panels.

9. The method of claim 1, wherein
   an outer casing surrounding the thermal insulation on the outside is provided, the outer casing being openable to fill and empty the accommodation space.

10. The method of claim 9, wherein
    the outer casing is inextricably connected to the thermal insulation or is integrally formed therewith.

11. A method to prepare a transport container for the transportation of cargo comprising:
    supplying, at a fitting location, preconditioned main latent heat storage elements having a target heat capacity to maintain the cargo within a target temperature range for a target period time, wherein the supplying of the preconditioned main latent heat storage elements takes place within a transfer time period before an accommodation space of the container is filled with the cargo to be transported,
    supplying, at the fitting location, supplementary heat energy storage elements which are preconditioned to a supplementary target temperature, wherein a supplementary heat capacity of the supplementary heat energy storage elements is matched to the transfer time period to ensure that the full target period of time is available for transportation of the cargo within the target temperature range, and
    filling, at a filling location, the accommodation space with the cargo to be transported, wherein the filling location is remote from the fitting location.

12. The method of claim 11, further comprising removing the supplementary heat energy storage elements from the accommodation space at the filling location before or during filling with the cargo.

13. The method of claim 12, further comprising storing the supplementary heat energy storage elements that have been removed for reuse as supplementary heat energy storage elements.

14. The method of claim 11, further comprising reusing previously used supplementary heat energy storage elements as supplementary heat energy storage elements.

15. The method of claim 11, further comprising providing an openable container with thermal insulation.

* * * * *